United States Patent Office.

ELIZA DEXTER MURFEY, OF NEW YORK, N. Y., ASSIGNOR TO THE MANHATTAN PACKING MANUFACTURING COMPANY, OF SAME PLACE.

Letters Patent No. 105,361, dated July 12, 1870; reissue No. 4,210, dated December 20, 1870.

IMPROVEMENT IN MATERIALS FOR BEARINGS AND PACKINGS.

The Schedule referred to in these Letters Patent and making part of the same.

I, ELIZA DEXTER MURFEY, of New York, State and county of New York, have invented an Improvement in Packing and Bearing Material, of which the following is a specification.

*Nature and Object of the Invention.*

My invention consists of a sheet of paper, leather, or equivalent material, to the surface of which is applied plumbago or equivalent substance or composition, so as to form a material which, when employed in packing and stuffing boxes, &c., will form a hard, durable, and efficient packing or bearing.

*General Description.*

To the surface of a sheet of paper, leather, or chamois skin is applied a lubricating powder, which may be either a simple substance, as plumbago, or any suitable composition.

In order to secure a more perfect adhesion of the powder to the sheet the latter may be so operated on by a fine-pointed instrument, or by a series of such instruments, as to produce a flocky or felt-like surface, which will form a lodgment for the powder, rendering the paper or other material a vehicle for carrying the powder, and the foundation of the same.

This operation may be performed in any suitable machine. It has been found, however, that by subjecting the material to the action of a series of circular saws, having teeth of such a shape as to penetrate into but not pass through the material, the flock-like surface may be imparted to the latter with great rapidity.

The material thus prepared is now in a suitable condition to receive the lubricant, which is first powdered and then sifted over the flocked sheet, so that the fine powder will penetrate the interstices of the flocked surface. The sheet is then passed between rolls and compressed, and the lubricant is thus imbedded in the body of the sheet, and forms, practically, a part of the same, so that it can only be separated therefrom by the disintegration of the material.

In some instances I saturate the sheet with a solution of rubber, in paraffine or other solvent, or with tallow or its equivalent, then dry in a heated chamber, so that any excess of solution not absorbed will drip from the sheet; perforate the latter, and apply and secure the powder, as before described, the pressure of the rolls forcing the powder into the perforations, forming a hard, smooth, polished sheet.

This sheet, with a backing of felt, leather, or its equivalent, will be found efficient as either a packing or bearing material. In most instances, however, it is best to place a series of sheets of paper or other fabric, one above the other, with a prepared sheet on the top; compress the whole, and fit the same in the packing or journal-box, or else to punch from the compressed mass blocks suitable for bearings, steps for spindles, &c.

After the material is inserted in the box the bearing surface of the same is rubbed with a suitable tool so as to produce a highly polished surface, it having been found that the bearing is thus rendered much more durable.

Instead of ordinary paper, parchment-paper may be employed; and the paper or other material may, if desired, be flocked on both sides.

If a hard packing is not required—such a packing, for instance, as is suitable for packing pistons—the sheet need not be compressed after applying the lubricating material, but may be introduced directly into the packing-box.

Various substances and compositions may be applied to the sheet, but I have found that burned hair, burned paper, asbestos, or rotten-stone, either separately or together, and mixed with plumbago, ivory-dust, and saw-dust, may be employed with advantage, and such compositions, alone or with addition of paper-pulp or fibrous substances, may be compressed on the surface of the sheet so as to form a hard mass capable of receiving a high polish, and very efficient as a bearing.

*Claims.*

1. A sheet of paper or other material coated or impregnated with plumbago or its equivalent, and applied to a bearing or step, as described.
2. The said sheet prepared as described, and condensed under pressure.
3. A packing or bearing, consisting of a sheet saturated with rubber or its equivalent, and having a composition applied to and compressed on the surface of the same, as set forth.
4. The said sheet perforated and coated or impregnated as described.
5. The said coated or impregnated sheet applied to a step or bearing, and polished, as set forth.
6. The combination, with a step or bearing, of the said sheet and a layer of felt or its equivalent, as specified.

In testimony whereof I have signed my name to this specification in the presence of two subscribing witnesses.

ELIZA D. MURFEY.

Witnesses:
THOMAS PRUDEN,
JNO. M. BAKER.